United States Patent Office 2,839,561
Patented June 17, 1958

2,839,561
DITHIOCARBONIC ACID ESTERS AND PRODUCTION

Gerhard Schrader, Opladen, Germany, assignor to Farbenfabriken Bayer Aktiengesellschaft, Leverkusen, Germany, a corporation of Germany No Drawing. Application January 31, 1956
Serial No. 562,597

Claims priority, application Germany February 10, 1955

8 Claims. (Cl. 260—455)

This invention relates to alkyl- and aryl-thiomethyl-dithiocarbonic acid esters of the general formula

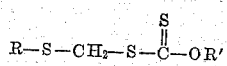

wherein R and R' stand for a member selected from the group consisting of aliphatic and aromatic radicals.

By the action of hydrochloric acid on paraformaldehyde in the presence of an aliphatic or aromatic mercaptan, reactive α-chloromethyl-alkyl- or -aryl-thioethers are found.

It is an object of this invention to provide a process for the production of dithiocarbonic acid esters from alkyl- or aryl-α-chloromethyl-thioethers.

It is another object of this invention to provide new dithiocarbonic acid esters having good insecticidal properties.

Further objects will become apparent as the following description proceeds.

In accordance with the invention it has now been found that by reacting reactive α-chloromethyl-thioethers with the alkali metal salts of dithiocarbonic acids stable and novel dithiocarbonic acid esters are formed which are distinguished by a remarkable insecticidal action whilst having only a small toxic action on warm-blooded animals.

Suitable α-chloromethyl thioethers are alkyl or aryl thioethers, such as methyl, ethyl, propyl, butyl, amyl, hexyl, heptyl, decyl, dodecyl, stearyl, phenyl, tolyl, benzyl, chlorophenyl, chlorobenzyl, dichlorobenzyl, pyridyl, and quinonyl thioethers. As dithiocarbonic acid esters there may be used the esters having as ester radical the alkyl or aryl thioether radicals aforementioned. Suitable salts of these dithiocarbonic acid esters are their alkali, alkaline-earth metal and ammonium salts; preferably the sodium and potassium salts thereof are used.

The reaction is expediently carried out in a suitable solvent, such as alcohols, hydrocarbons, acetone, ethyl, methyl ketone, and cyclohexanone. Particularly suitable solvents are ketones which readily dissolve the alkali metal salts of the dithiocarbonic acids. The reaction is carried out at temperatures of between 0 and 150° C. preferably between 20 and 80° C.

The new products are strongly yellow-colored oils which may be distilled in vacuo without decomposition.

The following examples are given for the purpose of illustrating the new process but are not intended to limit same in any way.

Example 1

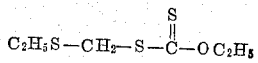

35 grams of α-chloromethyl-ethyl sulphide are added dropwise with stirring to a suspension of 48.6 grams of potassium ethyl xanthogenate in 200 millilitres of methylethyl ketone at 35–40° C. After the reaction has subsided, the reaction product thus obtained is poured into much water, the separated oil is taken up in chloroform, the chloroform solution is washed again with water, and then dried and fractionated. 50 grams of the new ester are obtained representing a light yellow water-insoluble oil, B. P. 100° C./1 mm. Hg. An emulsion of 0.1% of the ester killed 100% of tested red spiders.

Example 2

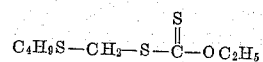

81 grams of potassium ethyl xanthogenate are suspended in 400 millilitres of methylethylketone. 70 grams of α-chloromethyl-n-butylthioether (B. P. 60–61° C./14 mm. Hg) are added with stirring to the suspension at 45° C. After usual working up, 90 grams of the new ester are obtained having a boiling point of 125° C. at a pressure of 2 mm. Hg. A 0.1% emulsion of the ester kills 100% of the tested red spiders.

Example 3

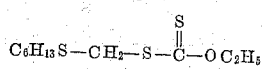

81 grams of potassium ethyl xanthogenate are suspended in 400 millilitres of methylethylketone. 84 grams of α-chloromethyl-n-hexylsulphide (B. P. 66° C./2 mm. Hg) are added with stirring to the suspension at 60° C., the temperature being maintained for a further hour at 60° C. After usual working up 120 grams of the new ester are obtained having a boiling point of 137° C./2 mm. Hg.

Example 4

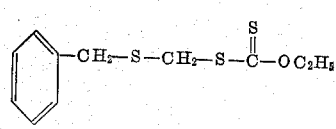

81 grams of potassium ethyl xanthogenate are suspended in 300 millilitres of methylethylketone. 86 grams of α-chloromethyl-benzyl-sulphide (B. P. 95° C./2 mm. Hg) are added with stirring at 70° C. The mixture is maintained at 80° C. for a further hour and after usual working up, 117 grams of the new ester are obtained boiling at 137° C./2 mm. Hg.

A 0.0001% aqueous solution of the new ester kills gnat larvae.

Example 5

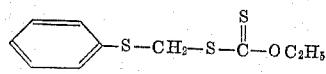

48 grams of potassium ethyl xanthogenate are suspended in 300 millilitres of methylethylketone. 46 grams of α-chloro-methyl-phenyl sulphide (B. P. 72–74° C./1 mm. Hg) are added with stirring to the suspension at 75° C. The temperature is maintained at 75° C. for a further hour. After usual working up 60 grams of the new ester having a boiling point of 115° C./0.05 mm. Hg are obtained.

A 0.01% aqueous solution of the new ester is sufficient to kill aphides.

Example 6

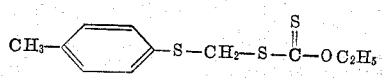

48 grams of potassium ethyl xanthogenate are suspended in 250 millilitres of methylethylketone. To this suspension there are added with stirring 46 grams of α-chloromethyl-p-cresylthioether (B. P. 88° C./1 mm. Hg) at 75° C. The temperature is kept at 75° C. for a further hour. After usual working up 60 grams of the new ester are obtained of B. P. of 160° C./2 mm. Hg.

I claim:
1. Alkyl- and aryl-thiomethyl-dithiocarbonic acid esters of the general formula

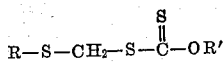

wherein R stands for a member selected from the group consisting of an alkyl, a phenyl, an alkaryl and an aralkyl radical and R' is a lower alkyl radical.

2. The dithiocarbonic acid ester of the formula

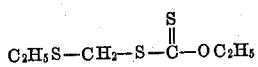

3. The dithiocarbonic acid ester of the formula

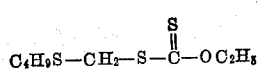

4. The dithiocarbonic acid ester of the formula

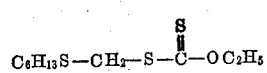

5. The dithiocarbonic acid ester of the formula

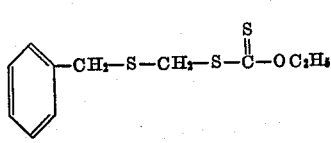

6. The dithiocarbonic acid ester of the formula

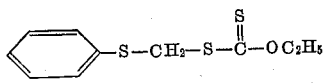

7. The dithiocarbonic acid ester of the formula

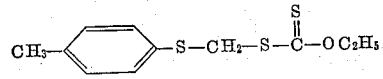

8. Process for the production of alkyl and aryl thiomethyl dithiocarbonic acid esters of the general formula

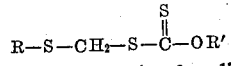

which comprises reacting a salt of a dithiocarbonic acid ester having the formula

with an α-chloromethyl thioether having the formula $ClCH_2SR$ in an inert liquid organic solvent wherein R stands for a member of the group consisting of an alkyl, a phenyl, an alkaryl and an aralkyl radical, X is a radical selected from the group consisting of alkali metal, alkali earth metal and ammonium, and R' is a lower alkyl radical.

References Cited in the file of this patent

UNITED STATES PATENTS 2,323,797    Cook _____ July 6, 1943